(12) United States Patent
Onderko

(10) Patent No.: US 7,817,045 B2
(45) Date of Patent: Oct. 19, 2010

(54) HANDLING SYSTEM FOR EXCEPTION RFID LABELS

(76) Inventor: John C. Onderko, P.O. Box 7124, Appleton, WI (US) 54912

( * ) Notice: Subject to any disclaimer, the term of this patent is extended or adjusted under 35 U.S.C. 154(b) by 285 days.

(21) Appl. No.: 11/755,113

(22) Filed: May 30, 2007

(65) Prior Publication Data
US 2008/0297310 A1 Dec. 4, 2008

(51) Int. Cl.
*G08B 13/14* (2006.01)
(52) U.S. Cl. .............. 340/572.8; 340/572.1; 340/572.2; 340/572.3; 340/572.4; 340/572.5; 235/385
(58) Field of Classification Search ... 340/572.1–572.9; 235/385
See application file for complete search history.

(56) References Cited

U.S. PATENT DOCUMENTS

| | | | | |
|---|---|---|---|---|
| 4,389,963 | A | * | 6/1983 | Pearson ...................... 116/308 |
| 4,656,463 | A | | 4/1987 | Anders et al. |
| 5,465,175 | A | * | 11/1995 | Woodgate et al. ........... 359/463 |
| 5,557,279 | A | * | 9/1996 | D'Hont ....................... 342/42 |
| 6,121,544 | A | | 9/2000 | Petsinger |
| 6,176,425 | B1 | | 1/2001 | Harrison et al. |
| 6,281,795 | B1 | | 8/2001 | Smith et al. |
| 6,610,379 | B1 | | 8/2003 | Adams et al. |
| 7,098,794 | B2 | | 8/2006 | Lindsay et al. |
| 7,106,196 | B2 | | 9/2006 | Adams et al. |
| 2005/0012616 | A1 | | 1/2005 | Forster et al. |
| 2006/0017570 | A1 | | 1/2006 | Moskowitz et al. |
| 2006/0044206 | A1 | | 3/2006 | Moskowitz et al. |
| 2006/0061475 | A1 | | 3/2006 | Moskowitz et al. |
| 2006/0125641 | A1 | | 6/2006 | Forster |
| 2006/0208907 | A1 | * | 9/2006 | Kokuryo et al. .......... 340/572.8 |
| 2006/0214802 | A1 | * | 9/2006 | Posamentier ............. 340/572.8 |
| 2006/0290501 | A1 | * | 12/2006 | Hammad et al. ......... 340/572.1 |
| 2006/0290502 | A1 | | 12/2006 | Rawlings |

FOREIGN PATENT DOCUMENTS

EP 1 698 999 9/2006

OTHER PUBLICATIONS

Search Report and Written Opinion, Aug. 20, 2008.

* cited by examiner

*Primary Examiner*—Davetta W. Goins
*Assistant Examiner*—Ojiako Nwugo
(74) *Attorney, Agent, or Firm*—Perkins Coie LLP

(57) ABSTRACT

A device for nullifying an exception RFID tag associated with a product or package includes a label with a replacement RFID tag configured thereon. The label is configured for placement on a package or product adjacent to the exception RFID tag. An electromagnetic shield is configured on the label and has a size and configuration so as to extend over the exception RFID tag when the label is placed adjacent thereto so as to disable subsequent reading of the exception RFID tag.

18 Claims, 3 Drawing Sheets

HANDLING SYSTEM FOR EXCEPTION RFID LABELS

TECHNICAL FIELD OF THE INVENTION

The present invention relates generally to the field of radio frequency identification (RFID) tags, and more particularly to a system for effective handling of faulty, defective, or invalid ("exception") RFID tags.

BACKGROUND

Radio Frequency Identification (RFID) devices are low-cost, "smart" chips or "tags" that can be embedded in or attached to any manner of article or products to convey information about the item via a scanner. The RFID tags are generally small label-like devices with a microchip or data circuit and a miniature embedded antennae. The tags may be passive or active, the active tags requiring an internal power supply. A reader or scanner interrogates the RFID tag with an electronic "trigger" signal. The tag in turn generates an electromagnetic pulse response that is readable by the scanner, the response containing any manner of product information. RFID tags can be embedded directly in product packaging, or contained in a label that is applied to the product or packaging.

Various commercial applications have been suggested for RFID tags, particularly in the area of retail marketing and sales. For example, RFID technology may be used to gather information related to consumer trends, purchasing habits, consumption rates, etc. RFID technology also has promise in the areas of inventory control, manufacturing process and control, product accountability and tracking systems, etc. Manufacturers, shippers, and retailers may be able to follow a given product through their respective systems from initial production through to point of sale. The commercial and manufacturing implementations of RFID technology are ever increasing.

Inevitably, a percentage of the mass-produced RFID tags are defective, or will fail after being applied to a product. For any number of reasons, these faulty tags (termed "exceptions") cannot be interrogated or convey their stored information and must be removed or replaced before a conventional RFID reader can further process the product. Current exception handling processes typically require manual handling or expensive and time consuming treatments to remove the defective tag and apply a new tag. Simply applying a new label (with RFID tag) over the old tag is generally not acceptable because the defective tag may interfere with performance of the replacement tag.

Various suggestions have been made in the art for deactivating or disabling RFID tags. For example US Pat. Appn. Pub. No. 2006/0290502 describes RFID tags that are disabled by altering the geometry of the embedded antenna within the RFID tag, thereby altering the field pattern of the antenna and preventing communication with an external reader. U.S. Pat. No. 7,098,794 discusses the need for deactivating RFID tags for privacy concerns and describes systems and methods for mechanically deactivating RFID tags with removable antennas, or preventing reading of the tag with removable shielding (i.e., a foil casing). US Pat. Appn. Pub. No. 2006/0214802 describes methods for shielding RFID tags in labels for selective reading of the tags during processing of the labels. Although the systems and methods described in the cited publications may prove useful for deactivating RFID tags, they are relatively time consuming and expensive, and are not particularly well suited for deactivating and simultaneously replacing an exception RFID tag.

A need thus exists in the art for an effective and inexpensive method and system for deactivating or disabling exception RFID tags while providing a replacement tag.

SUMMARY

Objects and advantages of the invention will be set forth in the following description, or may be obvious from the description, or may be learned through practice of the invention.

In one aspect, the present invention provides a relatively inexpensive and efficient means to nullify and replace an existing exception RFID tag on a product, package, or any manner of article. An "exception" RFID tag should be understood to include faulty or defective tags that cannot transmit data when interrogated, tags with invalid or out-of-date data that should not be read, and any RFID tag that is void, invalid, or not usable for any other reason. Such tags are "nullified", as used herein, such that the tags are rendered incapable of being interrogated or transmitting data.

In a particular embodiment, a device for nullifying and replacing an exception RFID tag includes a label construction having a replacement RFID tag configured thereon. The replacement RFID tag may be attached to a surface of the label, embedded in the label material, sandwiched between layers of the label, and so forth. The replacement RFID tag may contain stored data that is essentially the same as the exception RFID tag, particularly in the instance wherein it has been determined that the exception RFID tag has failed and cannot be interrogated. In alternate embodiments, the replacement RFID tag may contain different data as compared to the exception RFID tag, such as updated or supplemental information related to the product, and so forth.

The label may be formed from any conventional material suitable for attachment to a box, cartoon, package, and the like. The label may include any manner of flexible, rigid, or semi-rigid base substrate. It should be appreciated that the device is not limited by any particular combination of materials. The label has a shape, size, and configuration to compliment its intended purpose and location on a package or article, particularly for placement adjacent to the exception RFID tag.

The device includes a shield configured on the label. This shield may be formed of any one or combination of known electromagnetic shielding materials, and has a size and configuration so as to extend over at least a portion of the exception RFID tag when the label is placed adjacent thereto so as to disable subsequent reading of the exception RFID tag.

The shield may be provided in various forms. For example, the shield may be a flexible substrate, such as a metallic foil or laminate material, that is attached along an edge of the base label substrate. In an alternate embodiment, the shield may be defined by an extension of the base substrate material, which may be formed entirely of a suitable shielding material. In still an another embodiment, the shielding material, such as a foil, may be adhered or otherwise attached to an extension of the base substrate. It should be appreciated that countless configurations of the electromagnetic shield are within the scope and spirit of the invention.

To provide for ease of placement of the device on an article or package, the label may include an adhesive applied to the back surface thereof. This adhesive may be permanent or releasable, and may be protected before use by a removable peel strip. Additionally, to aid in attachment of the shield over the exception RFID tag, the shield may include an adhesive applied to the side thereof intended to cover the exception RFID. A removable peel strip may also protect this shield adhesive.

Relative placement of the shield with respect to the replacement RFID tag on the label can vary. For example, the shield may be disposed directly adjacent to the replacement RFID tag, and may be used to shield interrogation of the replacement RFID tag from a certain angle or location. In an alternate embodiment, the shield may be spaced from the replacement RFID tag so as to be incapable of extending over the replacement RFID tag. This configuration may be desired to prevent the shield from interfering with or alternating the antenna characteristics of the replacement RFID.

In certain embodiments, the shield is configured to detune the exception RFID tag so as to prevent reading or interrogation of the tag from any relative position, i.e., from the opposite side of the package or article. The shield may accomplish this feature by essentially changing the characteristics of the RFID antenna by contacting or non-contacting means to render the antenna incapable of transmitting at the system frequency. Depending on the frequency of the RFID system, the RFID tag antenna may be an inductive loop antenna or a capacitive grid antenna, and placement of the shield adjacent to the antenna may change the operating frequency characteristics of the antenna.

In another aspect of the invention, an RFID device is provided for association with any manner of article, the device providing the capability to easily and quickly switch between RFID tags. For example, the device may include two RFID tags having substantially the same data. In the event that the "active" tag becomes inoperable, such tag may be nullified and the other reserve tag may become active. In alternate embodiments, the RFID tags may contain different data. This device may include a base substrate having with the first and second RFID tags configured thereon. A shield is configured with the base substrate and has a size and configuration so as to extend over the first RFID tag in a first position, and over the second RFID tag in a second position. The exposed RFID tag is the active tag, and the covered RFID tag is the reserve tag.

As with the embodiments discussed above, the shield may be made of any suitable shielding material, and having any desired shape and configuration depending on its intended purpose. The shield may be a separate substrate material attached to the base substrate, or may be an extension of the base substrate. In a particular embodiment, the electromagnetic shield extends generally transversely from the base substrate between the first and second RFID tags. The shield may include an adhesive applied to opposite sides thereof for selective adhesive attachment over either of the first or second RFID tags. Respective peel strips may be provided over the adhesive sides.

Reference is made below to particular embodiments of the invention, examples of which are illustrated in the drawings.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1A:
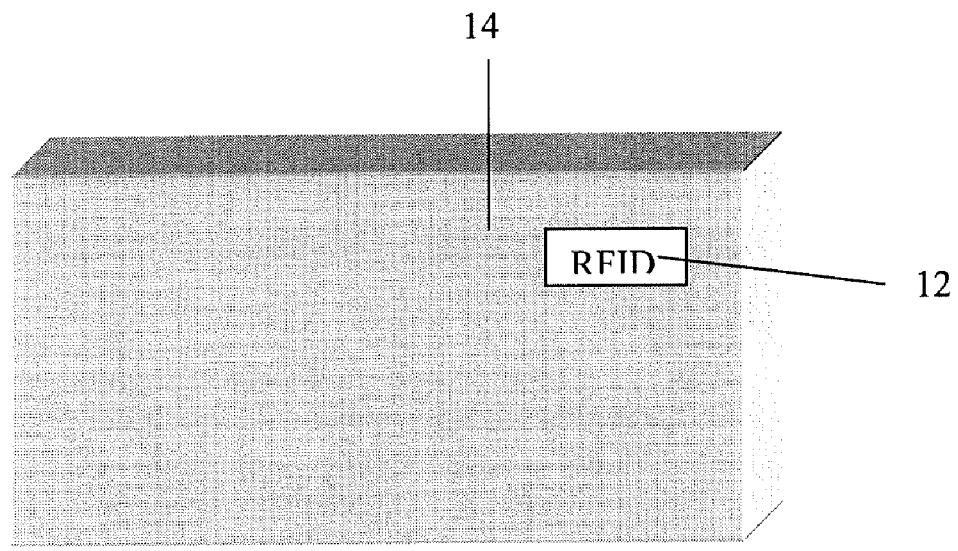
FIG. 1A is a perspective view of a package or article with an associated RFID tag.

Repeat use of reference characters throughout the present specification and appended drawings is intended to represent the same or analogous features or elements of the present technology.

DETAILED DESCRIPTION

Reference will now be made in detail to one or more embodiments of the invention, examples of which are graphically illustrated in the drawings. Each example and embodiment is provided by way of explanation of the invention, and not meant as a limitation of the invention. For example, features illustrated or described as part of one embodiment may be utilized with another embodiment to yield still a further embodiment. It is intended that the present invention include these and other modifications and variations.

RFID smart tag technology is known and understood by those skilled in the art, and a detailed explanation thereof is not necessary for purposes of describing the method and system according to the present invention. RFID tags of any known type may be used, including active RFID tags, passive RFID tags, and semi-passive RFID tags. Active RFID tags are battery-powered devices that transmit a signal to a reader and typically have long ranges, such as 100 feet or more. Passive RFID tags are not battery powered but draw energy from electromagnetic waves from an RFID reader. Passive RFID tags often have a range of about 10 feet or less. Semi-passive RFID tags employ a battery to run the circuitry of a chip but rely on electromagnetic waves from a reader to power the transmitted signal.

Generally, passive smart tags consist of an integrated circuit, other semiconductors such as diodes, a coiled, etched, or stamped antenna, passive components such as resistors and capacitors, and a substrate on which the components are mounted or embedded. A protective covering is typically used to encapsulate and seal the substrate. Inductive or passive smart tags are commercially available from a number of vendors, including Motorola, and a detailed description of certain types of these devices may be found in U.S. Pat. No. 6,259,367 B1, incorporated herein by reference in its entirety for all purposes. Another commercial source of suitable smart tags is Alien Technology Corporation of Morgan Hill, Calif., under the technology name FSA (Fluidic Self-Assembly). With the FSA process, tiny semi-conductor devices are assembled into rolls of flexible plastic. The resulting "smart" substrate can be attached or embedded in a variety of surfaces. The smart tag technology under development at the Auto-ID Center at Massachusetts Institute of Technology (Cambridge, Mass.) can also be used within the scope of the present invention. Further information on smart tags and related technology is disclosed in U.S. Pat. No. 6,451,154, "RFID Manufacturing Concepts," issued Sep. 17, 2002 to Grabau et al.; U.S. Pat. No. 6,354,493, "System and Method for Finding a Specific RFID Tagged Article Located in a Plurality of RFID Tagged Articles," issued Mar. 12, 2002 to Mon; PCT publication WO 02/48955, published Jun. 20, 2002; U.S. Pat. No. 6,362,738, "Reader for Use in a Radio Frequency Identification System and Method," issued Mar. 26, 2002 to Vega; D. McFarlane, "Auto-ID Based Control," White Paper for the Auto-ID Centre Institute for Manufacturing, University of Cambridge, Cambridge, United Kingdom, Feb. 1, 2002, available at www.autoidcenter.org/research/CAM-AUTOI D-W H-004. pdf; and Chien Yaw Wong, "Integration of Auto-ID Tagging System with Holonic Manufacturing Systems," White Paper for the Auto-ID Centre Institute for Manufacturing, University of Cambridge, Cambridge, United Kingdom, September 2001, available at www.autoidcenter.org/research/CAM-WH-001.pdf. Such references are hereby incorporated herein by reference in their entirety for all allowed purposes.

High frequency bands can be used in RFID technology, such as bands between 300 MHz and 10 GHz. SCS Corporation (Rancho Bernardo, Calif.), for example, markets smart tag technology at 2.45 GHz. Ultra-wide band technology can also be adapted for RFID systems.

With RFID or other smart tag technology, a vendor may associate a unique identification code with products to expedite the check-out process, track consumer trends, update inventories, and so forth. RFID tags may contain codes relative to an article, or batch of raw materials, with physical property data being entered into a database in which the data is associated with the identification code. When the article or raw material shipment is received at a processing or manufacturing facility, an RFID scanner may automatically scan the RFID chip and retrieve the associated information from the database, verify that usable raw material or article has been received at the correct facility, provide quality information, and so forth.

RFID chips may be used to track products grouped in various hierarchies: (1) individual items or single packages containing multiple items for consumer purchase; (2) cartons or cases of multiple items; (3) pallets of multiple cartons or cases; and (4) loads (e.g., truckloads, shiploads, or railcar loads) of multiple pallets. The products at each of these levels may be assigned an RFID label that is associated with information pertaining to at least one adjacent hierarchical level. For example, an RFID label on a pallet may be associated in a database with the RFID labels for each carton on the pallet, or may be associated with data pertaining to the RFID label from the truckload.

RFID tags responsive to environmental conditions may be helpful in preventing improper storage and transport conditions, particularly for paper-based packaging materials such as corrugated board or paperboard which may be sensitive to moisture or may fail when improperly loaded or oriented. Proper condition monitoring of conditions experienced by packaging or by the contents of the packaging may be important, for example, for perishable items such as food, beverages, agricultural materials, dairy products, and biological materials such as bacteria, enzymes, microbes, live plants and plant samples, live animals or insects, etc. Hazardous and toxic materials may also benefit from improved monitoring of environmental conditions during storage and transport.

Exemplary RFID tag manufacturers include Matrics, Alien Technology, Philips Semiconductor, and Texas Instruments. Manufacturing may be done by robotic techniques (e.g., "flip-chip"/"pick and place" techniques), fluidic self-assembly (FSA), the Philips "I-connect" method or the Philips "vibratory assembly" method, or other known processes. Exemplary RFID reader manufacturers include Internec Technologies, Symbol Technologies, Matrics, AWID (e.g., their multi-protocol reader operate at various frequencies), and others. Software systems to support RFID systems are provided by IBM Global Services (which has acquired PriceWaterhouseCoopers), Texas Instruments, Manhattan Associates (particularly for integrated supply chain executions), SAP, and others. Printed RFID labels may be made using equipment from Zebra Technologies and other vendors.

An antenna may be made by any known method, including metal deposition, printing of conductive inks, etc. By way of example, the RFID tags may employ conductive ink technology of RCD Technologies (Bethlehem, Pa.). Antennae may be printed using any known format, and may, for example, comprise double-sided, interconnected coils. Any known frequency may be used, such as 100 kHz or 125 kHz ("low frequency"), 13.56 MHz ("high frequency"), 860 930 MHz such as 900 MHz or 915 MHz ("ultra high frequency" or UHF), and 2.45 GHz or 5.8 GHz (microwave frequency), or other known frequencies.

The RFID system may follow the systems disclosed by the MIT Auto-ID Center, including the use of an electronic product code (EPC); an EPCIS system (Electronic Product Code Information Services from EPCglobal) to manage the codes being read with a distributed architecture and processes such as data smoothing, reader coordination, data forwarding, data storage, and task management; and Object Name Service (ONS) for matching EPC information to item information, typically using a domain name service (DNS) to route computers to Internet sites; and Physical Markup Language (PML) to describe information about a product.

The various embodiments of RFID devices according to the invention include a shield that nullifies the exception RFID tag. This shield may be flexible or rigid, and formed wholly or in part of any material suitable for blocking or significantly attenuating electromagnetic signals of a frequency suitable for the RFID tags. Examples of such materials include metal foil, a metalized surface on a MYLAR or polyester base, a composite of conductive material and non- or semi-conductive material, etc. The effective portion of the shield (i.e., the portion that actually blocks or attenuates the signals) may cover the entire exception RFID tag label area, or may only cover a smaller area, such as the antenna area of the tag.

Because the frequency of the RFID system is known, the shield may be designed to act as a signal attenuator within the frequency range of operation by attenuating the RF signals within the operational range below a device activation level thereby preventing any data transfer between the RFID tag and a scanner/interrogator. For example, the shield can be configured to either reflect or absorb RF signals within the frequency range of operation.

The shield may be formed from a conductive coating applied to a substrate using any number of techniques such as painting, printing, stenciling, powder coating, vacuum metallization, and the like. The coating has a thickness and a structure that allows that coating to absorb or reflect RF signals. In another embodiment, the shield may be a non-ferromagnetic foil that is attached to a support substrate.

In other embodiments, the shield may include dielectric material that insulates the circuit component of the RFID tag from excitation energy, or the antenna from transmitting. One example of such a dielectric material is a ceramic-loaded ink that can be simply and inexpensively printed on a substrate. Other suitable dielectric materials are known in the art.

In still other embodiments, the shield may include materials having a high magnetic permeability. Examples of such materials include ferrites and certain metals that interact with the magnetic field produced by the RFID circuit, thereby altering the operating characteristics of the circuit.

It should be appreciated that the invention is not limited to any particular shielding material, and encompasses any single or combination of materials that effectively nullifies the exception RFID tag by preventing the device from being excited by a scanner/interrogator or inhibiting the antenna from transmitting.

FIG. 1A conceptually illustrates any manner of article or package 14 having an RFID tag 12 configured therewith. The RFID tag 12 may be attached to the surface of the article 14, for example as a component of an adhesively applied label, or embedded in the packaging material of the article 14, as commonly understood by those skilled in the art. The RFID tag 12 may be considered as an exception tag that has become defective or invalid for any reason.

Figure 1B:
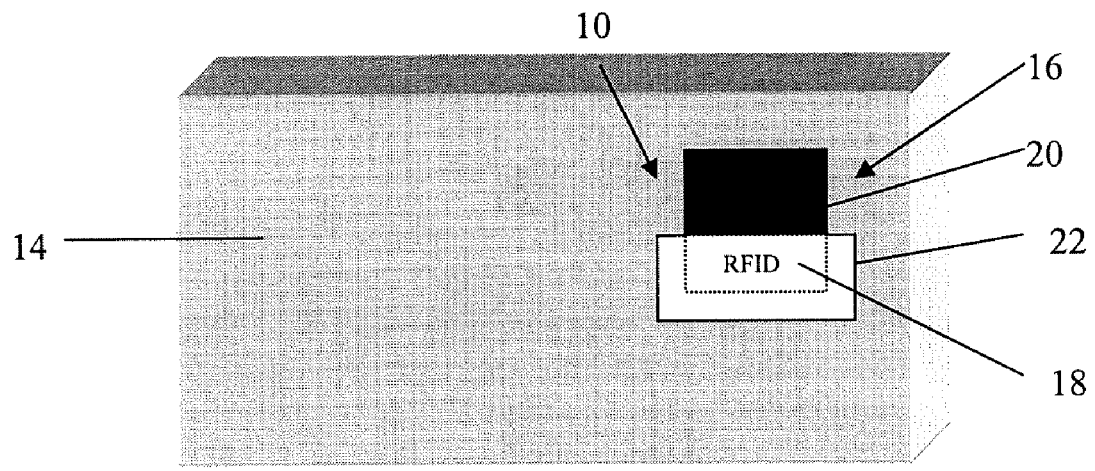
FIG. 1B is a perspective view of the package of FIG. 1 with an embodiment of the present invention applied thereto.

FIG. 1B illustrates an embodiment of a device 10 for nullifying and replacing the exception RFID tag 12. In this particular embodiment, the device 10 is in the form of a label 16 that is applied to the article 14 adjacent to the exception RFID tag 12. The device 10 includes a replacement RFID tag 18 attached to a base substrate 22, or embedded in the substrate 22. As discussed above, the replacement RFID tag 18 contains any manner of information or data to replace or supplement the data of the exception RFID tag 12.

The label 16 may be formed from any conventional material suitable for attachment to a box, carton, package, and the like. In this regard, the base substrate 22 may include any manner of flexible, rigid, or semi-rigid material depending on the desired use of the device 10 relative to the article 14. The label 16 and base substrate 22 have a shape, size, and configuration to compliment its intended purpose on a package or article 14, particularly for placement adjacent to the exception RFID tag 18.

Figure 2:
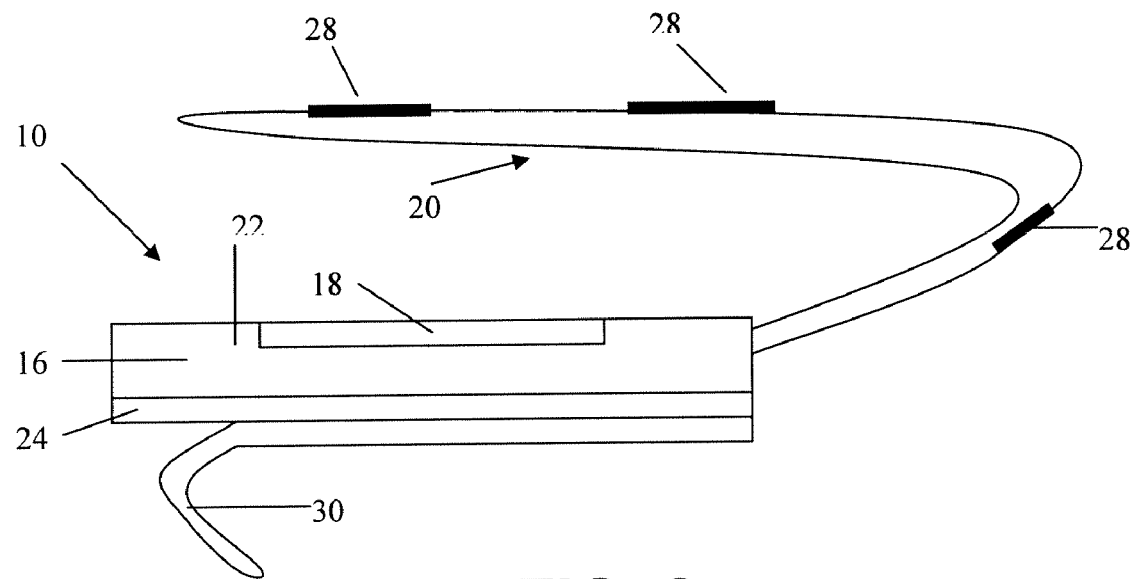
FIG. 2 is a side view of an embodiment of an RFID label according to the invention.

Referring to FIG. 2, the base substrate 22 may include an adhesive 24 applied to a back surface thereof. This adhesive may be a permanent or releasable adhesive and aids in placement of the device 10 on the article or package 14. The adhesive 24 may be protected prior to use by a removable peel strip 30.

The device 10 also includes a shield, generally 20, configured on the label 16. As discussed above, this shield may be formed from any one or combination of known shielding materials. The shield 20 has a size and configuration so as to extend over at least a portion of the exception RFID tag 12 when the label 16 is placed adjacent thereto on the article 14. The shield 20 may be provided in various ways. For example, in the embodiment of FIG. 2, the shield 20 is a flexible substrate formed from a metallic foil or other laminate type material. The shield 20 is attached along an edge to the base substrate 22. In use of the device 10, the shield 20 is folded over the exception RFID tag 12. A permanent or releasable adhesive 28 may be applied to the side of the shield 20 intended to be placed over the exception RFID tag 12 to ensure that the shield 20 remains securely attached over the RFID tag. The adhesive 28 may be protected by a removable peel strip prior to use of the device 10.

Figure 3:
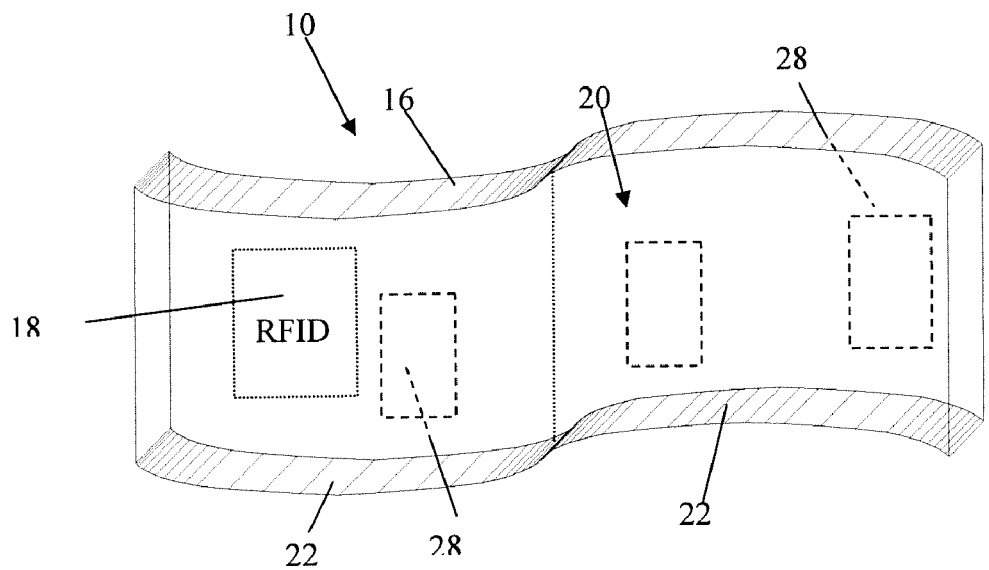
FIG. 3 is a top partial perspective view of an alternative embodiment of an RFID label according to the invention.

In an alternate embodiment, the shield 20 may be defined by an extension of the base substrate 22, as illustrated in FIG. 3 wherein the device 10 is formed substantially as a integral label 16 having an RFID tag 18 attached to a service thereof or embedded within multiple layers of the base substrate 22. A portion of the base substrate 22 also defines the shield 20. This portion includes any one or combination of shielding materials either applied to the surface thereof, or embedded within the substrate 22. An adhesive 28 may be applied at any location on the underside of the substrate 22 for attachment of the device 10 on the article 14.

It should be appreciated that relative placement of the shield 20 with respect to the replacement RFID tag 18 on the device 10 may vary. For example, the shield 20 may be disposed directly adjacent to the replacement RFID tag 18, or spaced from the replacement RFID tag so as to be incapable of extending over the replacement RFID tag 18. This configuration may be desired to prevent the shield from interfering with or altering the intended characteristics of the replacement RFID tag 18.

Figure 4:
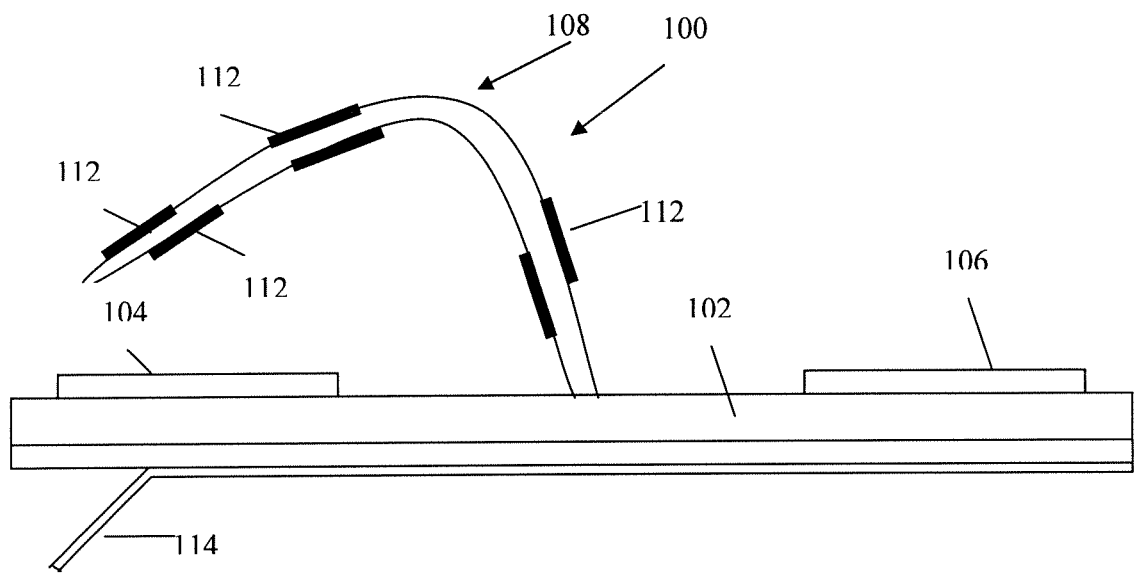
FIG. 4 is a side view of still another embodiment of an RFID label according to the invention.
Figure 5:
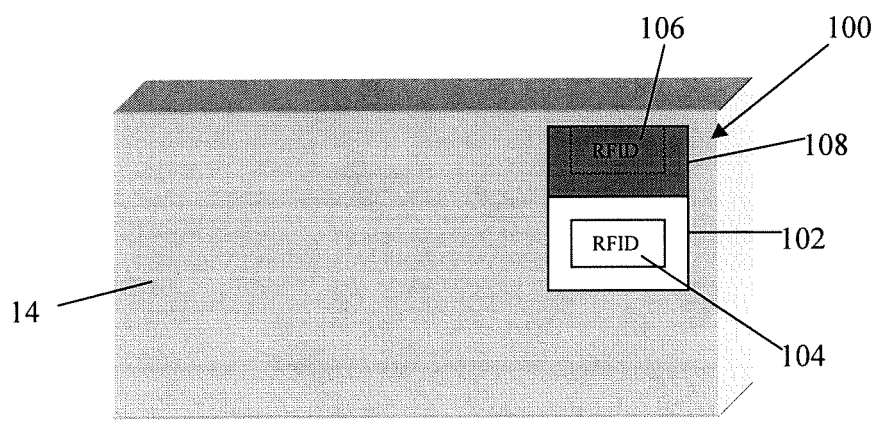
FIG. 5 is a perspective view of a package or article with the device of FIG. 5 applied thereto.

FIGS. 4 and 5 depict an alternative embodiment of the invention wherein an RFID device 100 is provided for association with any manner of article 114. The device 100 provides the capability to easily and quickly switch between different RFID tags carried by the device 100. For example, referring to FIG. 4, the device 100 may include a first RFID tag 104 and a second RFID tag 106. These tags may contain the identical information or different information with respect to the article 114. The device 20 includes a shield 108 that is movable between a first position wherein the shield 108 is disposed over the first RFID tag 104, and a second position wherein the shield 108 is disposed over the second RFID tag 106. The exposed RFID tag may be considered as the "active" tag, wherein the covered or shielded RFID tag may be considered as the "reserve" RFID tag. In the event that the active RFID tag becomes inoperable or invalid, such tag may be nullified by removal of the shield 108 from the reserve RFID tag, and subsequent placement of the shield 108 over the invalid RFID tag, as discussed above. The reserve RFID tag will then become the new active tag. The shield 108 may include any pattern of releasable adhesive 112 on the opposite surfaces thereof for releasable attachment over either of the RFID tags 104, 106. The adhesives 112 may be protected by a releasable peel strip.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A device for nullifying an exception RFID tag, the device comprising:

a label having a replacement RFID tag configured thereon, wherein the label is configured for placement on a package or product laterally adjacent to the exception RFID tag; and an electromagnetic shield carried by the label, wherein the electromagnetic shield comprises a flexible substrate attached to the label such that the flexible substrate is sized and configured to extend over the exception RFID tag when the label is placed laterally adjacent thereto and disables subsequent reading of the exception RFID tag, and wherein the electromagnetic shield is spaced apart from the replacement RFID tag on the device and is incapable of extending over the replacement RFID tag.

2. The device of claim 1 wherein the label comprises an adhesive-backed base substrate.

3. The device of claim 2 wherein the electromagnetic shield comprises an extension of the base substrate.

4. The device of claim 2 wherein the electromagnetic shield further comprises an adhesive on at least one side thereof for adhesive attachment over the exception RFID tag.

5. The device of claim 1 wherein the replacement RFID tag contains the same information regarding the product or package as the exception RFID tag.

6. The device of claim 1 wherein the replacement RFID tag contains different or additional information regarding the product or package as compared to the exception RFID tag.

7. The device as of claim 1 wherein the electromagnetic shield is configured to additionally detune the exception RFID tag and prevent reading thereof from any relative position.

8. The device of claim 2 wherein the electromagnetic shield comprises a non-ferromagnetic foil attached to a support substrate.

9. The device of claim 2 wherein the electromagnetic shield comprises a ceramic-loaded ink printed on a support substrate.

10. The device of claim 2 wherein the electromagnetic shield comprises a metal foil, a metalized surface on a polyester base, or a composite of conductive material and non- or semi-conductive material.

11. The device of claim 2 wherein the electromagnetic shield comprises a conductive coating applied to a support substrate.

12. A device, comprising:
   a label configured for placement on a product laterally adjacent to a faulty RFID tag, wherein the label has a replacement RFID tag configured thereon; and
   means for shielding the faulty RFID tag and preventing the faulty RFID tag from being excited by an interrogator, where the means for shielding the faulty RFID tag comprises a flexible substrate carried by the label and sized to extend over the faulty RFID tag when the label is placed laterally adjacent thereto.

13. The device of claim 12 wherein the flexible substrate is spaced apart from the replacement RFID tag.

14. The device of claim 12 wherein the means for shielding the faulty RFID tag comprises a non-ferromagnetic foil.

15. The device of claim 12 wherein the means for shielding the faulty RFID tag comprises a dielectric material.

16. The device of claim 12 wherein the means for shielding the faulty RFID tag comprises a ferrite material or metal that interacts with the magnetic field produced by the faulty RFID tag and alters one or more operating characteristics of the faulty RFID tag.

17. The device of claim 12 wherein at least one side of the flexible substrate comprises an adhesive portion configured to be attached over at least a portion of the faulty RFID tag.

18. The device of claim 12 wherein the label and means for shielding the faulty RFID tag comprise a single, unitary structure.

* * * * *